US005979914A

United States Patent [19]

Reyes

[11] Patent Number: 5,979,914

[45] Date of Patent: *Nov. 9, 1999

[54] TOP JAW WITH MACHINABLE INSERTS

[76] Inventor: Peter A. Reyes, 6700 Hadley Dr., Fort Worth, Tex. 76180

[ * ] Notice: This patent is subject to a terminal disclaimer.

[21] Appl. No.: 09/058,634

[22] Filed: Apr. 10, 1998

Related U.S. Application Data

[63] Continuation-in-part of application No. 08/735,674, Oct. 23, 1996, Pat. No. 5,791,661

[60] Provisional application No. 60/043,730, Apr. 16, 1997.

[51] Int. Cl.[6] .................................................... B23B 31/16

[52] U.S. Cl. .......................... 279/153; 279/123; 279/154

[58] Field of Search .................................... 279/123, 124, 279/152–154; 269/279–284

[56] References Cited

U.S. PATENT DOCUMENTS 2,773,406 12/1956 Dachauer ................................ 269/282
3,190,666 6/1965 Testa ....................................... 279/123
4,023,815 5/1977 Dunham .................................. 279/153
5,791,661 8/1998 Reyes ..................................... 279/153

*Primary Examiner*—Steven C. Bishop
*Attorney, Agent, or Firm*—James E. Bradley

[57] ABSTRACT

A lathe chuck jaw assembly utilizes top jaws which have replaceable inserts mounted to their clamping faces. The inserts are used to provide a contact surface to hold a workpiece during machining. The contact surfaces of the inserts may be machined for matching a particular workpiece shape such as round stock, hex stock, square stock, or custom configurations. A boring ring is installed between the top jaws and rotated so that the inserts may be symmetrically machined. Alternatively, a polygonal insert blank having congruent sections which are joined with keys along their outer sides may be loaded in the lathe chuck and machined for a particular workpiece. A pad adapter base for supporting a hardened collet pad is also disclosed.

17 Claims, 6 Drawing Sheets

30 36 31 46 42 37 32 62 42a 64 56 53 63 55 51 43 58 42 61

31 71 73 11 79 11 72

TOP JAW WITH MACHINABLE INSERTS

This application is a conversion of provisional application Ser. No. 60/043,730, filed Apr. 16, 1997, and a continuation-in-part of application Ser. No. 08/735,674, filed Oct. 23, 1996, now U.S. Pat. No. 5,291,661 entitled "Compliant Chuck Jaws."

TECHNICAL FIELD

The present invention relates generally to lathe chuck jaws and more particularly to lathe chuck top jaws with machinable inserts.

BACKGROUND ART

A lathe power chuck typically has a body with three slots which are offset by 120 degrees from one another. Each slot contains a master jaw which moves radially inward and outward in unison with the others. A replaceable top jaw mounts to each master jaw for moving inward to grip a workpiece. The top jaws have malleable inserts mounted to them which engage the workpiece. Although inserts can be purchased, a machinist may wish to fabricate inserts using a lathe. While this method is feasible, a more convenient means is needed.

DISCLOSURE OF THE INVENTION

A lathe chuck jaw assembly utilizes top jaws which have replaceable inserts mounted to their clamping faces. The inserts are used to provide a contact surface to hold a workpiece during machining. The contact surfaces of the inserts may be machined for matching a particular workpiece shape such as round stock, hex stock, square stock, or custom configurations. A boring ring is installed over the top jaws and the chuck is rotated so that the inserts may be symmetrically machined.

Alternatively, a polygonal insert blank having congruent sections which are joined with keys along their outer sides may be loaded in the lathe chuck and machined for a particular workpiece. A pad adapter base for supporting a hardened collet pad is also disclosed.

DETAILED DESCRIPTION OF THE DRAWINGS

Figure 1:
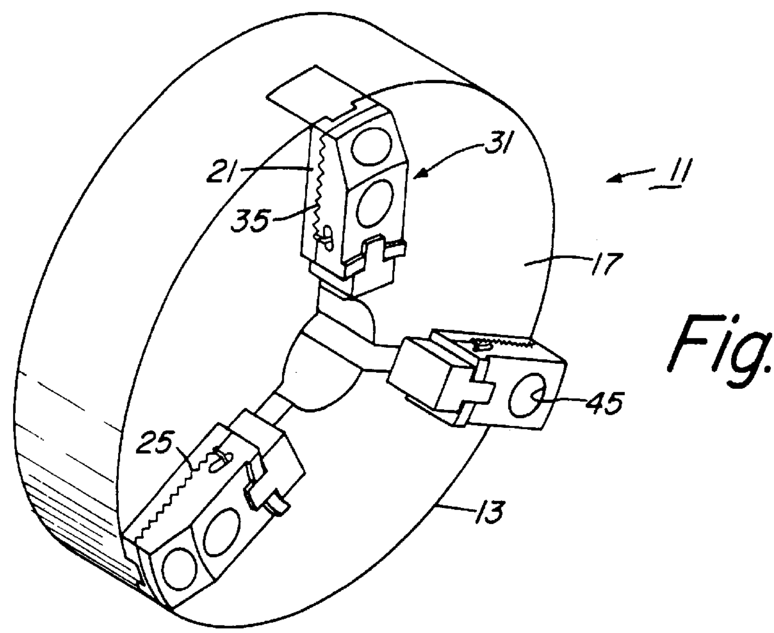
FIG. 1 is an isometric view of a power chuck having top jaws constructed in accordance with the invention.
Figure 3:
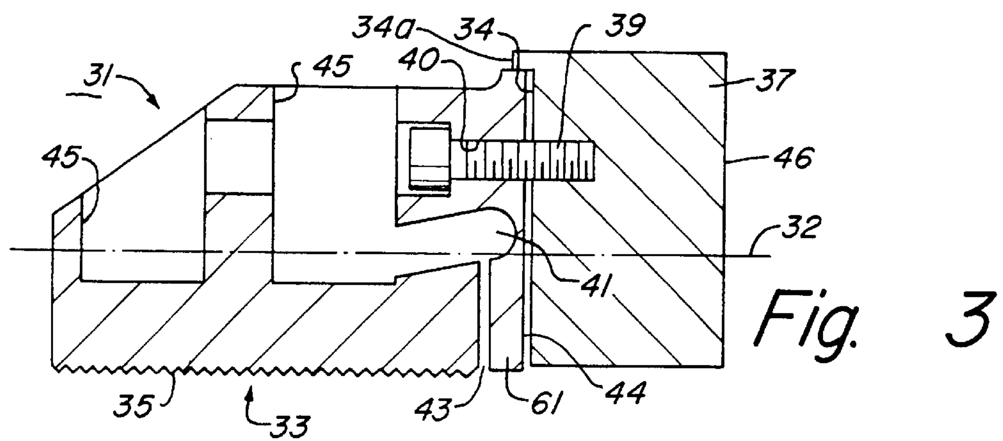
FIG. 3 is a sectional side view of the top jaw of FIG. 2 taken along the line 3—3 of FIG. 2.

Referring to FIG. 1, one embodiment of a lathe chuck jaw assembly is shown. Chuck 11 has a cylindrical body 13 and a plurality of top jaws 31 that are each removably secured to a master jaw 21. Master jaws 21 radially slide along a top side 17 of body 13. The words "top" and "bottom" are used only for convenience and do not refer to actual upper and lower surfaces. Each master jaw 21 has a row of grooves 25 on a top side which engage mating grooves 35 on a bottom side 33 of top jaw 31 (FIG. 3). In an alternate embodiment (not shown), master jaw 21 engages top jaw 31 with a tongue and groove arrangement. Top jaw 31 is removably secured to master jaw 21 with bolts (not shown) that extend through holes 45 in top jaw 31. The bolts thread into receptacles (not shown) in master jaw 21 that align with holes 45.

Figure 2:
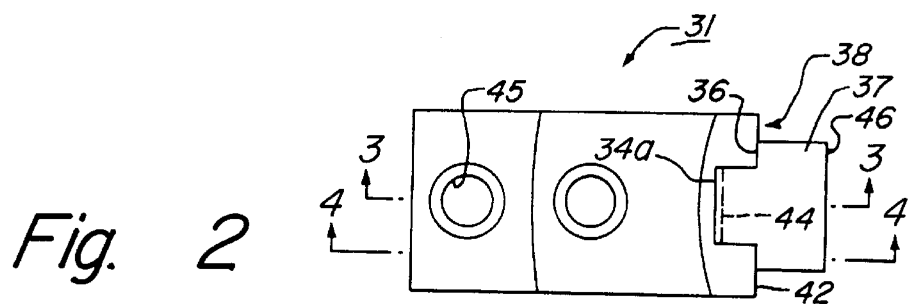
FIG. 2 is a top view of one of the top jaws of FIG. 1.
Figure 4:
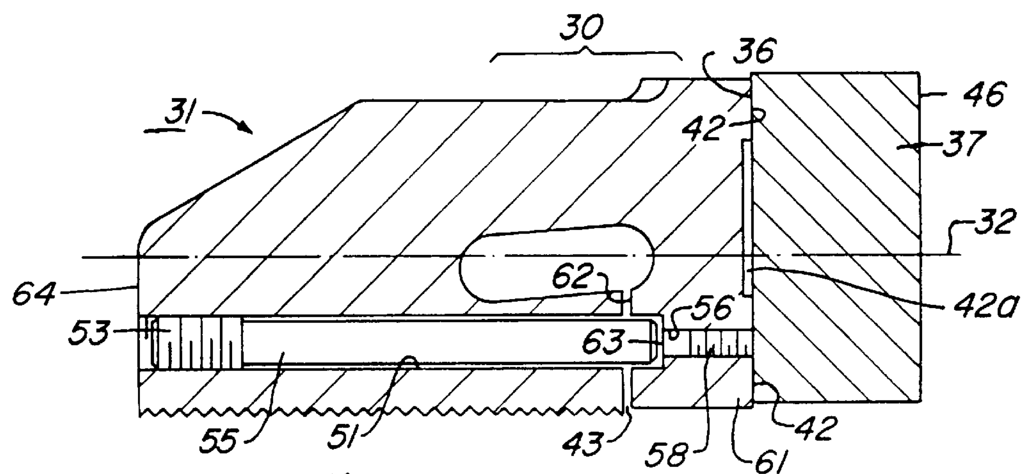
FIG. 4 is a sectional side view of the top jaw of FIG. 2 taken along the line 4—4 of FIG. 2.

Referring to FIGS. 2–4, top jaw 31 has a longitudinal axis 32 and a bottom side 33 that is parallel to axis 32. Top jaw 31 has a replaceable insert 37 that has two symmetrical, rearward-facing shoulders 36 (FIG. 2). Each shoulder 36 lands on upper and lower, forward-facing shoulders 42 located on a face 38 of top jaw 31 such that insert 37 contacts face 38 at four locations (FIGS. 2 and 4). As shown in FIG. 2, insert 37 has a width that is less that a width of face 38 such that portions of face 38 and shoulders 42 remain exposed. Shoulders 42 are portions of face 38 of top jaw 31 and contact insert 37, defining a recess **42*a* on face 38. A central tab 34 extends rearward between shoulders 36 and into a groove 44 in face 38. Tab 34 does not make contact with the bottom of groove 44. Tab 34 has a rearward-protruding shoulder 34*a* on an upper end which lands on top of top jaw 31. Shoulder 34*a* helps to axially locate insert 37 while limiting the downward movement of insert 37 relative to top jaw 31 to avoid reliance on the shear strength of a bolt or screw 39**.

Insert 37 is removably secured to face 38 with screw 39 (FIG. 3). Screw 39 extends through a hole 40 which is located in the forward one of holes 45 and is on the longitudinal axis 32 when viewed from above. Insert 37 is shown with a flat face 46 which will be machined to a desired geometry as per FIG. 5. Collectively, inserts 37 are used to provide contact surfaces to hold a workpiece to be machined. Inserts 37 can be for round stock, hex stock, square stock, or can be custom made to other configurations.

Referring to FIGS. 3 and 4, each top jaw 31 has an elliptical aperture or recess 41 that is at an acute angle relative to axis 32. Top jaw 31 has a slot 43 that is perpendicular to axis 32 and connects recess 41 with bottom side 33. Slot 43 is approximately one-tenth of an inch wide in the preferred embodiment. Both recess 41 and slot 43 extend completely through top jaw 31, from one side to the other.

Referring to FIG. 4, top jaw 31 has two threaded holes 51 that are parallel to axis 32. Holes 51 extend from a rearward end 64 of top jaw 31 toward insert 37. Holes 51 extend through slot 43 and a slot wall 62, but holes 51 do not completely penetrate top jaw 31. Each hole 51 contains a set screw 53 and a loading pin 55 whose combined length is less than the length of hole 51. When screw 53 is threaded into hole 51, screw 53 slidingly moves pin 55 toward insert 37. If screw 53 is advanced to full make-up, pin 55 will contact the end or backstop 63 of hole 51. Backstop 63 should be considered as a part of slot wall 62. Top jaw 31 also contains two small threaded holes 56 with set screws 58 that are with concentric with holes 51. Screws 58 may be removed in order to clean out backstops 63 or to knock out pins 55.

The positions of pins 55 are set to provide a desired clearance between backstop 63 and the ends of pins 55. This determination adjusts the effective width of slot 43 and, thus, the amount of allowed deflection. The amount of deflection required for each job is a function of the material of the workpiece, the chuck hydraulic pressure, and the condition of the chuck. During set-up, pins 55 are loosened and spaced apart from backstop 63. Next, a workpiece is "preloaded" in chuck 11 by clamping top jaws 31 on the workpiece at the desired pressure. Once the amount of deflection required for a certain job is determined by preloading chuck 11, pins 55 are tightened against backstop 63 while top jaws 31 are clamped on the workpiece. This is done to limit deflection of insert 37 to that point. Top jaw 31 may also be effectively locked from all motion while under load by simply locking pins 55 against backstop 63 prior to applying any load. When chuck 11 is opened to load the next workpiece, insert 37 of top jaw 31 can flex in a forward direction from the clamped position. The forward ends of pins 55 will now be spaced away from backstop 63.

The maximum deflection of a forward end 61 is limited by the width of slot 43 and the placement of pins 55 as pins 55 will eventually contact or bottom out on backstop 63. Pins 55 may be positioned to provide a desired gap between pins 55 and backstop 63. In this position, forward end 61 will be able to deflect only until pins 55 contact backstop 63 since screws 53 will stop further rearward movement of pins 55 by acting as a hard stop. When insert 37 applies clamping pressure to the workpiece, recess 41 and slot 43 allow a forward end 61 of top jaw 31 to deflect relative to bottom side 33. When deflecting, the width of slot 43 decreases until pins 55 contact backstop 63. Referring to FIG. 4, zone 30 is the area of top jaw 31 which undergoes bending to achieve the required compliant behavior. This motion allows insert 37 to maintain even pressure on the workpiece instead of cocking, thereby minimizing deflection of the workpiece during machining. In this motion, zone 30 of top jaw 31 acts like a spring and a hinge.

Figure 5:
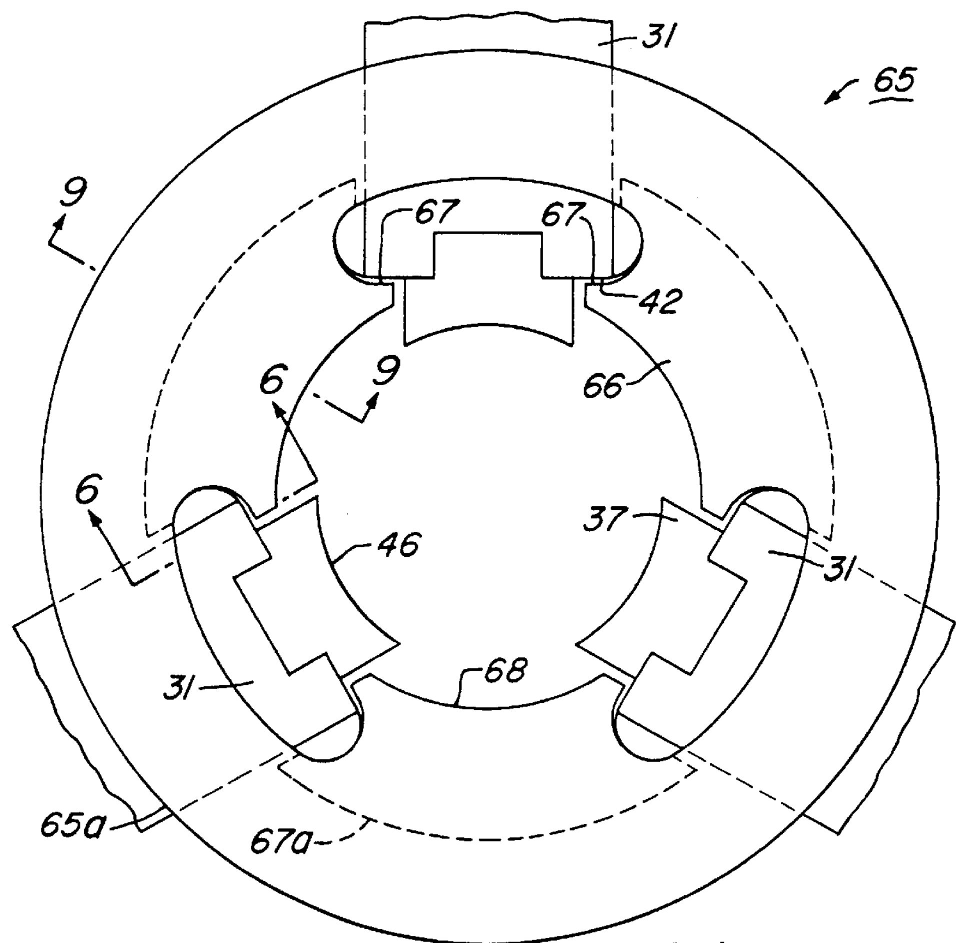
FIG. 5 is a top view of a boring ring located on the power chuck of FIG. 1 for machining soft inserts of the top jaws of FIG. 1.
Figure 6:
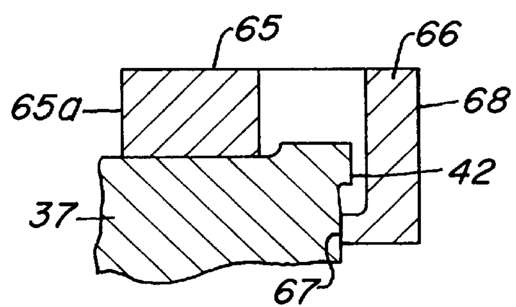
FIG. 6 is a partial sectional side view of the boring ring and top jaw of FIG. 5 taken along the line 6—6 of FIG. 5.
Figure 9:
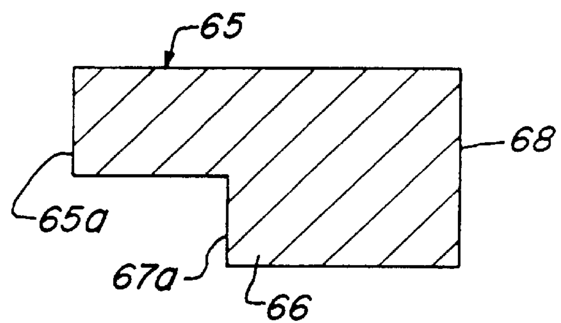
FIG. 9 is a sectional side view of the boring ring of FIG. 5 taken along the line 9—9 of FIG. 5.

Faces 46 of inserts 37 may be machined for matching a particular workpiece shape. Referring to FIGS. 5, 6 and 9, a boring ring 65 having three, equally spaced apart lugs 66 is shown. Lugs 66 are located on a lower side of boring ring 65. Each lug 66 has a pair of small, outward-facing shoulders 67 which extend radially outward from a lower end. An arcuate side wall 67*a* extends radially outward from each shoulder 67 to reduce stress in boring ring 65 while it is under load. A central hole 68 is formed in boring ring 65. The outer edge 67*a* of each lug 67 does not extend completely to the outer diameter 65*a* of ring 65, resulting in an annular band as shown in FIG. 9.

Boring ring 65 is installed on chuck 11 with top jaws 31 located between lugs 66. As chuck 11 is clamped, top jaws 31 are moved inward, allowing recess 42*a* on face 38 of top jaws 31 to clamp tightly against shoulders 67. Boring ring 65 resists the clamping load of each top jaw 31 by distributing the load to the other top jaws 31. Chuck 11 is then rotated so that the faces 46 of inserts 37 may be machined while boring ring 65 remains untouched. FIG. 5 shows faces 46 after machining while FIGS. 1–4 show faces 46 before machining.

Figure 7:
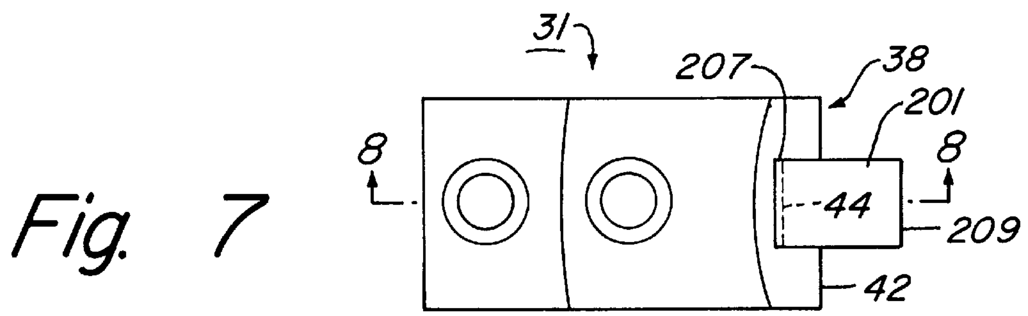
FIG. 7 is a top view of an alternate embodiment of an insert for one of the top jaws of FIG. 1.
Figure 8:
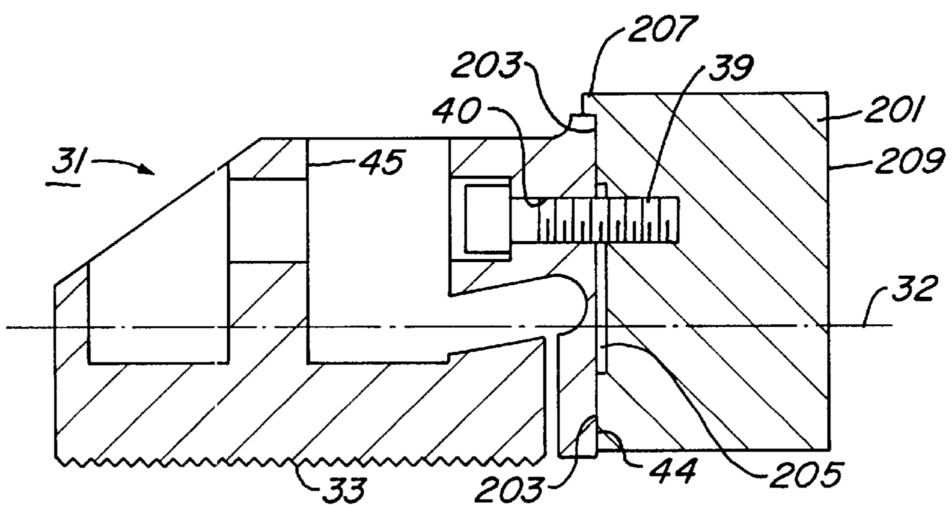
FIG. 8 is a sectional side view of the top jaw and insert of FIG. 7 taken along the line 8—8 of FIG. 7.

A second embodiment of the inserts is shown in FIGS. 7 and 8. The same top jaw 31 may be used for this embodiment. As described above, top jaw 31 has a longitudinal axis 32, a bottom side 33, a face 38, bolt holes 45, and a screw 39 in a hole 40. A replaceable insert 201 having two symmetrical, rearward-facing shoulders 203 (FIG. 8) is seated in groove 44 of face 38. Shoulders 203 allow the central body of insert 201 to be separated from groove 44 by a space 205. As shown in FIG. 7, insert 201 has a width which is slightly less than a width of groove 44 so that shoulders 42 on face 38 remain exposed. Insert 201 has a rearward-protruding shoulder 207 on an upper end which lands on top of top jaw 31. Shoulder 207 limits the downward movement of insert 201 relative to top jaw 31 to avoid reliance on the shear strength of screw 39. Like insert 37, insert 201 is removably secured to face 38 with screw 39 (FIG. 8). Insert 201 is shown with a flat face 209 which will be machined to a desired geometry. Collectively, inserts 201 are used to provide contact surfaces to hold a workpiece to be machined, or can be supplied in a ready-to-use hardened condition and configuration.

Figure 10:
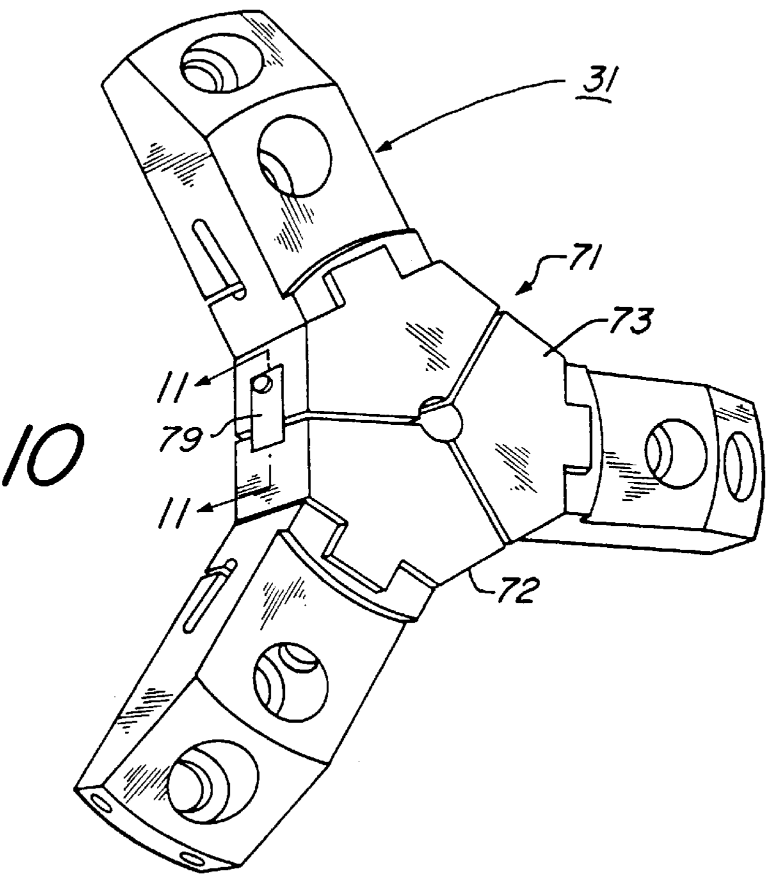
FIG. 10 is an isometric view of the top jaws of FIG. 1 holding a second embodiment of the soft insert blanks prior to machining into inserts.
Figure 11:
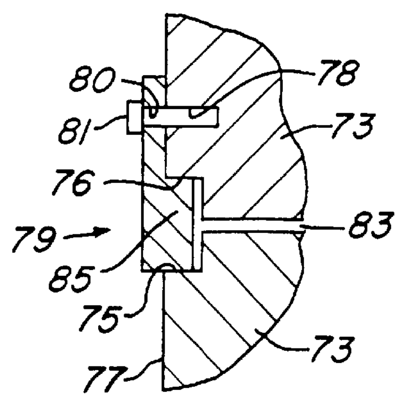
FIG. 11 is an enlarged sectional side view of portions of two of the insert blanks of FIG. 10 taken along the line 11—11 of FIG. 10.

A third embodiment of the inserts is shown in FIGS. 10–11. A polygonal insert blank 71 is loaded into top jaws 31. Insert blank 71 is a block with three flat outer walls 72 which has been previously cut into a number of congruent sections 73 equal to the number of top jaws 31. Each section 73 has rectangular, paired notches 75, 76 cut into its outer wall 72. Section 73 also has a threaded hole 78 at outer wall 72 which extends radially inward. Each notch 75 functions as a slot for closely receiving a key 79.

Sections 73 are joined together to form insert blank 71 by inserting key 79 into notch 76, inserting a screw 81 through a hole 80 in key 79, and threading screw 81 into hole 78 to rigidly secure key 79. After installing a key 79 on each section 73, sections 73 are assembled together by inserting a protruding end 85 of each key 79 into the paired notch 75 on an adjacent section 73 until the complete insert blank 71 is assembled. Keys 79 are provided to keep sections 73 slightly spaced apart by slots 83 while undergoing clamping pressure. Without keys 79, movement of sections 73 relative to each other might occur. Insert blank 71 can then be loaded into chuck 11 with each section 73 secured by one of the screws 39. Insert blank 71 is machined by boring the three sections 73 simultaneously. After machining is completed, keys 79 and screws 81 may be removed from sections 73.

Figure 12:
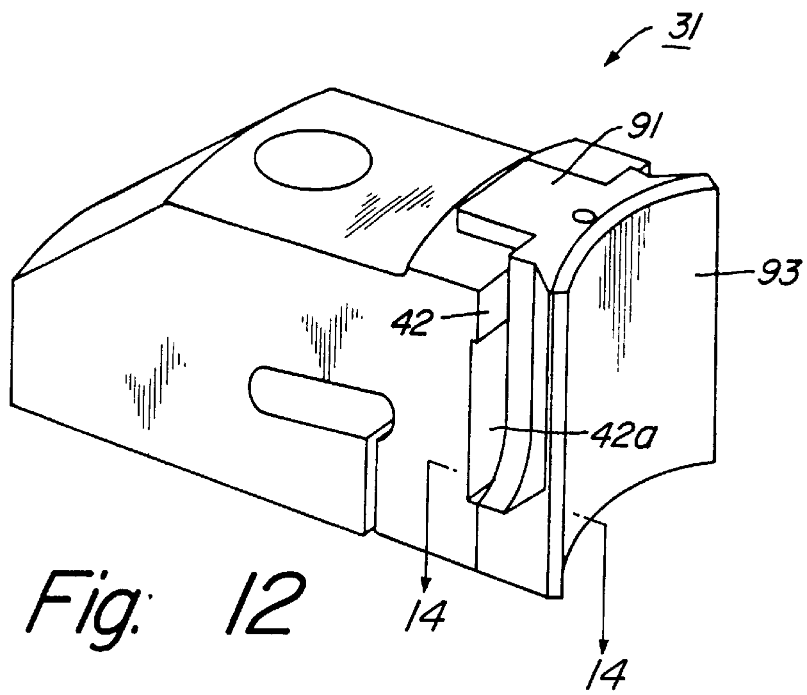
FIG. 12 is an isometric view of one of the top jaws of FIG. 1 fitted with an adapter to hold a hardened collet pad.
Figure 13:
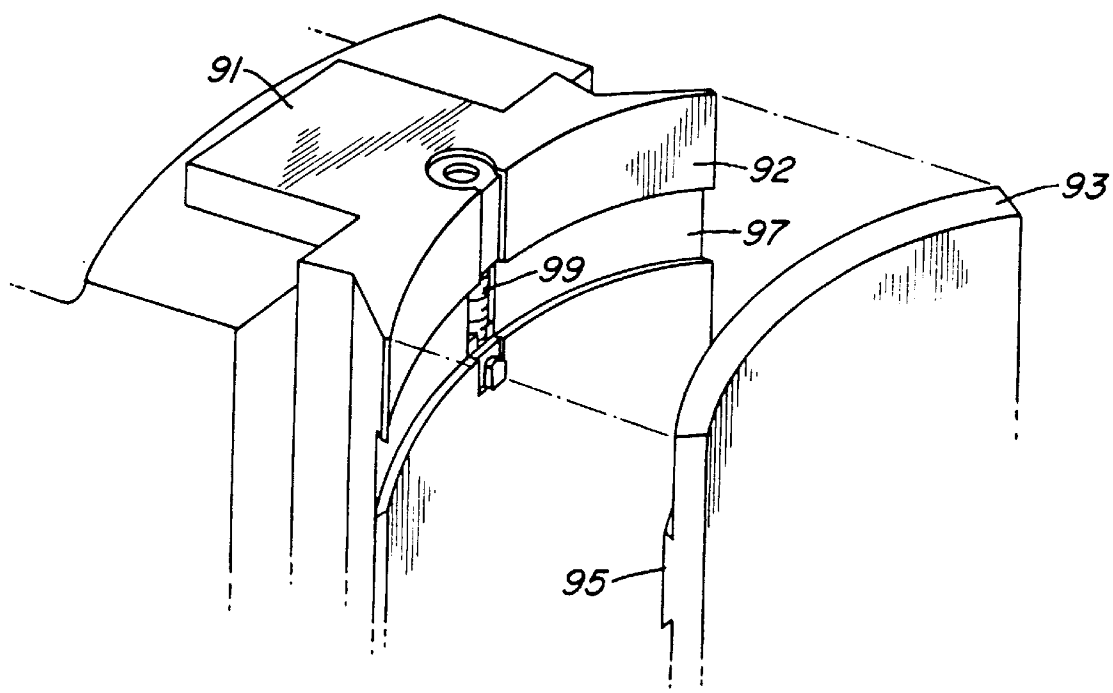
FIG. 13 is a partial, enlarged isometric view of the top jaw, adapter and pad of FIG. 12.
Figure 14:
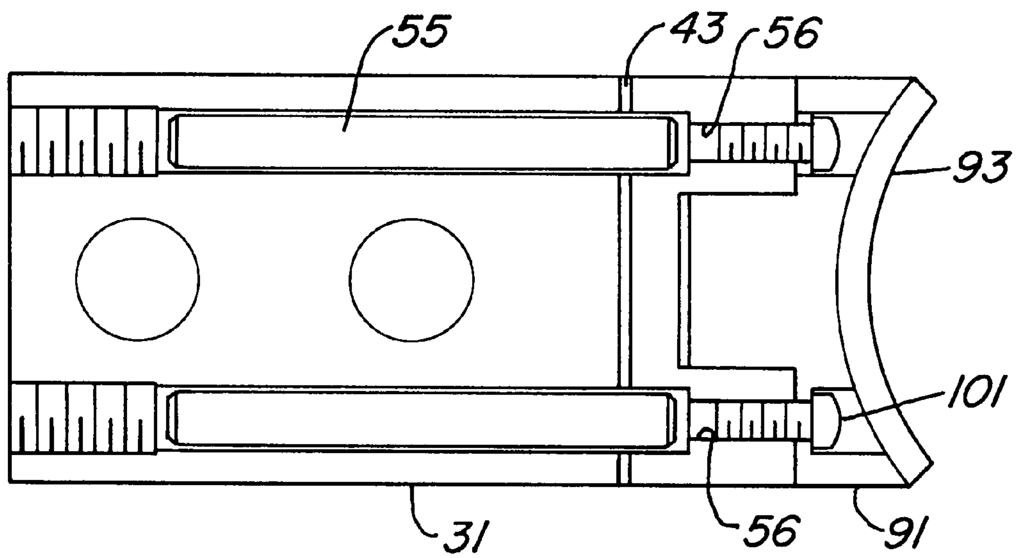
FIG. 14 is a sectional view of one of the top jaws of FIG. 1 taken along the line 14—14 of FIG. 12 showing an alternate arrangement of the top jaw and adapter.

Referring to FIGS. 12–14, a fourth embodiment of the invention is shown wherein a pad adapter 91 is used as base to support a hardened collet pad 93. Like insert 37 (FIG. 2), adapter 91 has a central tab, rearward-facing shoulders, and a threaded hole for attachment to top jaw 31 with a clamp screw (not shown) such as screw 39 of FIG. 3. As shown in FIG. 14, two screws 101 extend into threaded holes 56 of top jaw 31 to provide a rigid three-point connection between adapter 91 and top jaw 31. Adapter 91 is configured to expose recess 42*a* so that boring ring 65 (FIG. 5) may be used to machine the faces 92 of adapters 91. Collet pad 93 is commercially available in a variety of configurations and requires no machining. Collet pad 93 has a dovetailed shoulder 95 which seats in a transverse, dovetailed slot 97 on a forward side of adapter 91. Collet pad 93 attaches to adapter 91 in a conventional manner with a compression screw 99.

This invention has advantages. Novel means for creating customized jaw pads for top jaws and for truing the faces of the top jaws are described. An improved adapter for mounting hardened collet pads is also disclosed.

While the invention has been shown in some of its forms, it should be apparent to those skilled in the art that it is not so limited, but is susceptible to various changes without departing from the scope of the invention. For example, the insert embodiments may also be used in combination with rigid top jaws which do not have a compliant feature.

I claim:

1. A method for creating pads for top jaws, comprising:

(a) providing a pad blank with a rotational axis;

(b) cutting the pad blank into congruent sections by making at least two radial cuts from the rotational axis of the pad blank, each section having two flat radial side walls that are adjacent to side walls of other sections, the side walls of each section being connected by an outer wall which is provided with a notch at a junction with one of the radial side walls;

(c) assembling the sections with the radial side walls of each section separated from adjacent side walls by a slit having a width;

(d) releasably fastening a key to the outer wall of each of the sections such that each of the keys extends across one of the slits into engagement with one of the notches to prevent the width of any of the slits from changing;

(e) loading the assembled sections into a chuck; and (f) after completing step (e), boring a hole into the assembled sections along the rotational axis to create at least two pads.

2. The method of claim 1 wherein steps (a) and (b) comprise providing the outer wall of each of the congruent sections with a flat surface.

3. An apparatus for a lathe chuck having a rotational axis and a plurality of master jaws which are movable radially relative to the rotational axis, the apparatus comprising:

a plurality of top jaws, each having a bottom side for engaging one of the master jaws of the lathe chuck, an inner end containing a groove, an outer end and a longitudinal axis that is adapted to be perpendicular to the rotational axis; and a jaw insert having a tongue on an outer side that is received within one of the grooves on the inner end of each of the top jaws, each of the jaw inserts having an inner side for gripping a workpiece, the outer side of each the jaw inserts being of lesser width than the inner end of each of the top jaws, defining exposed radially inward facing shoulders on the inner ends of each of the top jaws with the outer side of the jaw insert located therebetween.

4. The apparatus of claim 3, further comprising a clearance between an outer side of the tongue and an inward facing side of the groove on the inner end of each of the top jaws.

5. The apparatus of claim 3, wherein the outer side of the insert further comprises:

an outward facing shoulder on each side of the tongue which abuts a portion of one of the inward facing shoulders on each of the top jaws.

6. The apparatus of claim 3, further comprising a boring ring having a central hole, the boring ring being adapted to be concentrically located on the rotational axis and having a recess extending radially from the central hole for each of the top jaws, each recess having a pair of shoulders which face radially outward and receive between them one of the inserts for engaging the inward facing shoulders of the top jaws for performing machining operations on the inner sides of the inserts.

7. The apparatus of claim 3 wherein each of the jaw inserts is mounted to its respective top jaw with a threaded fastener which extends through a jaw insert mounting hole in the top jaw, the jaw insert mounting hole being approximately parallel to the longitudinal axis of the top jaw.

8. The apparatus of claim 7, further comprising a master jaw mounting hole extending through each of the top jaws perpendicular to the jaw insert mounting hole for receiving a bolt to fasten each of the top jaws to one of the master jaws; and wherein the threaded fastener has a head which is located inward of the master jaw mounting hole to allow the top jaw to be removed from the master jaw without removing the insert.

9. The apparatus of claim 3 wherein each of the inward facing shoulders on each of the top jaws comprises upper and lower shoulder portions which protrude inward from a recessed portion.

10. The apparatus of claim 3, wherein each of the inserts comprises an adapter for receiving a curved collet pad on the inner side of the adapter.

11. A method for creating finished jaw inserts for top jaws of a lathe chuck with a rotational axis and a cutting tool, comprising:

(a) securing a jaw insert to each of the top jaws and dimensioning a width of each of the jaw inserts to create exposed radially inward facing shoulders on the inner ends of the top jaws with the jaw inserts located therebetween;

(b) providing a boring ring with a central hole and a recess leading from the hole for each of the top jaws, each recess having two outward facing shoulders;

(c) placing the boring ring on the rotational axis and moving the top jaws radially inward so that the jaw inserts protrude radially inward from the recesses into the central hole and the shoulders on the inner ends of the top jaws rigidly engage the shoulders on the boring ring; and then (d) rotating the lathe chuck and moving the cutting tool into the central hole and into contact with the jaw inserts to form a working face on each of the jaw inserts for engagement with a workpiece.

12. An apparatus for a lathe chuck having a rotational axis and a plurality of master jaws which are movable radially relative to the rotational axis, the apparatus comprising:

a plurality of top jaws, each having a bottom side for engaging one of the master jaws of the lathe chuck, an inner end containing a groove, an outer end and a longitudinal axis that is adapted to be perpendicular to the rotational axis;

an adapter having a tongue received within the groove on the inner end of each of the top jaws, each of the adapters having an outer side that has a lesser width than the inner end of each of the top jaws, defining exposed radially inward facing shoulders on the inner end of each of the top jaws, each of the adapters having a curved, radially inward facing surface;

a fastener on the inward-facing surface of each of the adapters; and a collet pad mounted to the inward facing surface with the fastener.

13. The apparatus of claim 12, further comprising a clearance between an outer side of the tongue and an inner side of the groove on the inner end of each of the top jaws.

14. The apparatus of claim 12 wherein each of inward facing shoulders on the top jaws comprises upper and lower shoulder portions which protrude inward from a recessed portion.

15. The apparatus of claim 12, further comprising a boring ring having a central hole, the boring ring being adapted to be concentrically located on the rotational axis and having a recess extending radially from the central hole for each of the top jaws, each recess having a pair of shoulders which face radially outward and receive between them one of the adapters for engaging the inward facing shoulders of the top jaws for truing up the inward-facing surfaces prior to installing the collet pads on the inward-facing surfaces.

16. The apparatus of claim 12 wherein the outer side of the adapter further comprises an outward facing shoulder on the outer side of the adapter on each side of the tongue that abuts a portion of one of the inward facing shoulders on each of the top jaws.

17. The apparatus of claim 12, wherein the inner side of each of the adapters has a greater width than the outer side of each of the adapters.

* * * * *